May 5, 1942.                M. E. WILLOUGHBY                2,281,814
                              TORCH SUPPORT
                            Filed July 9, 1941

INVENTOR.
                                    BY  Mark E. Willoughby.
                                        Geo Stevens.
                                            atty.

Patented May 5, 1942

2,281,814

UNITED STATES PATENT OFFICE 2,281,814

TORCH SUPPORT

Mark E. Willoughby, Superior, Wis.

Application July 9, 1941, Serial No. 401,611

4 Claims. (Cl. 266—23)

This invention relates to improvements in temporary supports or rests particularly adapted for use in connection with oxy-acetylene torches, or the like.

The principal object of the invention is to provide a rest of this type having a more or less universal adjustment, and one which may be completely folded out of the way when it is not desired to use the same.

Other objects and advantages of the invention will appear in the following description thereof.

Referring now to the accompanying drawing, forming part of this application and wherein like reference characters indicate like parts:

Figures 1, 2:
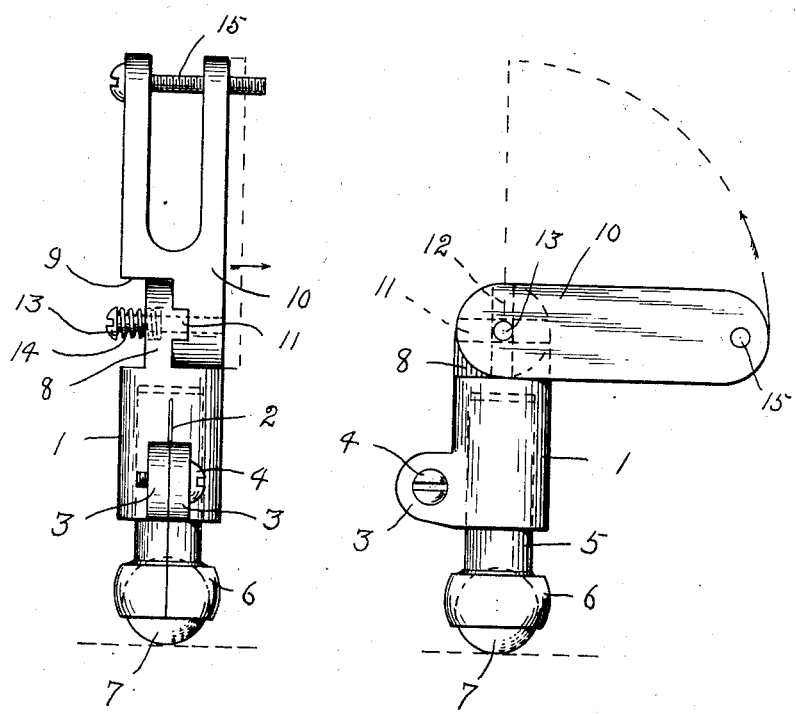
Figure 1 is a side elevation of the device in its partial axial adjustment.
Figure 2 is a similar view, at right angles to Figure 1, showing the device in one of its angular forms of adjustment.

In the drawing the numeral 1 indicates what may be termed the body portion of the device, and which is preferably of cylindrical form and hollow for a portion of its length. The lowermost extremity of this hollow portion is made expandable or contractable by one side thereof being split as at 2 for a portion of the length of said hollow part, and, on either side of which split portion and extending laterally therefrom, two lug-like members 3 are formed, through which is installed the adjusting screw 4, being threaded only in one of said lugs so as to readily act as clamping or releasing means by the adjustment of said screw.

Within this hollow body portion and from the lower terminous thereof is installed the vertically adjustable split shank 5 of the ball holding member, the head of same being illustrated at 6 which is readily adjustable about the ball 7, such latter form of castor like or ball bearing is known to be old in the art, however by this combination with the body portion it is obvious that the shank 5 may be raised or lowered by proper manipulation of the screw 4 and thus provide exceedingly simple means for the vertical adjustment of the rest.

Extending upwardly from the upper terminous of the body portion 1 is a reduced lug like portion 8, the same terminating in semi-circular form so as to fit snugly and adjustably the stepped portion 9 of the uppermost pivotal portion 10 of the rest. The innermost face of the lug 8 is provided with a transverse bar like extension 11 which is designed for registrable cooperation with similarly shaped channels 12 in the depending extension of the member 10, and through this extension is provided an interiorly threaded hole which is axially aligned with the center of the semi-circular portion of the lug 8, and for the reception of the screw 13. It is to be noted that the hole for this same screw through the lug 8 is stepped or has an enlarged portion on the opposite face of the lug for convenient reception of the expansive spring 14 which is held tightly in position by the screw 13 and thus holds the two pivotal parts of the rest in any one of its pivotally adjusted positions, providing convenient means for use of the rest either in its fully longitudinally extended position or in any of the other angular positions therefrom desired, as for example in its folded position against the torch when not in use.

The uppermost portion 10 is as illustrated bifurcated with a suitable adjustable bolt 15 for convenient attachment of any form of torch engaging means.

Having thus described my invention, what I claim and desire to secure by Letters Patent, is:

1. A plural tube torch support comprising a member having a longitudinally slotted shank for clamping engagement about the tubes of a torch, a lug extending from said shank, a hollow body portion having a lug extending therefrom and pivotally engageable with said shank lug, a socket having a shank longitudinally adjustable within said hollow body and supporting an anti-friction ball therein.

2. A plural tube torch support comprising a member having a longitudinally slotted shank for clamping engagement about the tubes of a torch at right angles thereto, a longitudinally extending lug on said shank, a hollow body portion having a lug pivotally engageable with said shank lug, and a socket having a shank longitudinally adjustable in said hollow body and supporting an anti-friction ball therein.

3. A plural tube torch support comprising a member having a longitudinally slotted shank adapted for clamping engagement about the tubes of a torch, a lug extending from said shank, a hollow body portion having a lug pivotally engageable with said shank lug, and a ball holding member having a shank at one end for longitudinal adjustment within said hollow body and a socket in its other end supporting an anti-friction ball therein.

4. A torch support of the type described comprising a pair of pivotally united members, the free end of one being adapted to clampingly engage the tubes of a torch and the free end of the other being hollow, and a ball holding member having a shank at one end for longitudinal adjustment within said hollow body and a socket in its other end supporting an anti-friction ball therein, said hollow end of said pivotal member having means to hold the shank of the ball holding member in any adjusted position therein.

MARK E. WILLOUGHBY.